Figure 1:
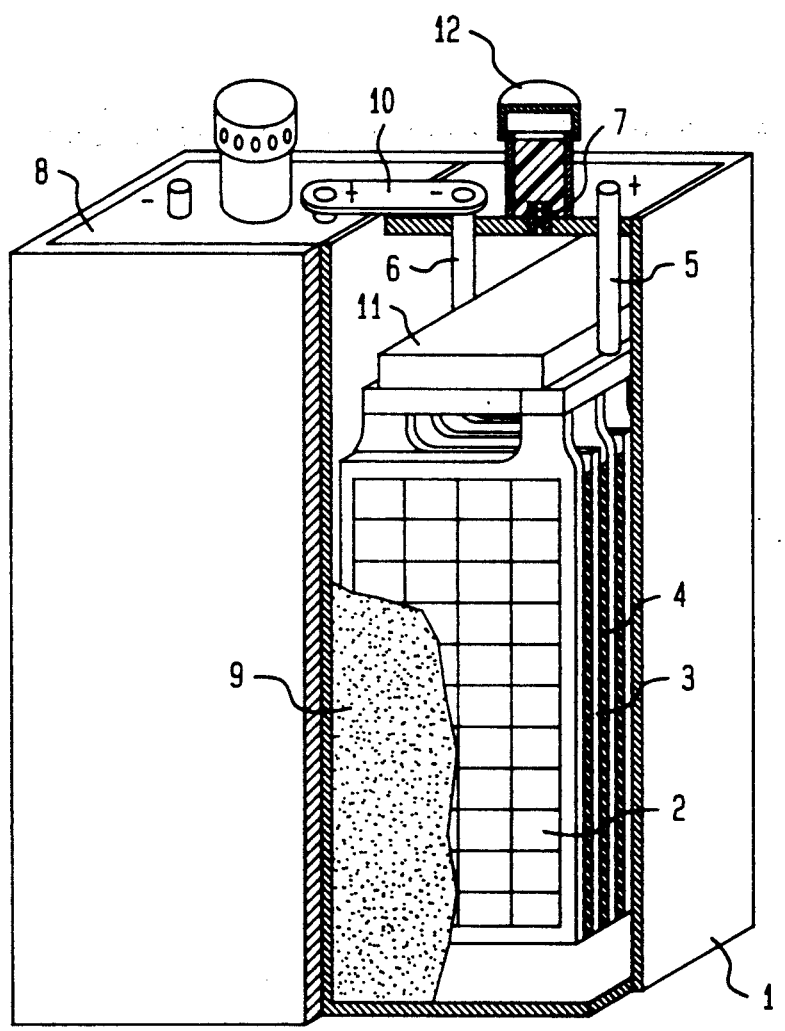

United States Patent [19]

Wang et al.

[11] Patent Number: 5,202,196

[45] Date of Patent: Apr. 13, 1993

[54] HIGH CAPACITY COLLOIDAL STORAGE BATTERY, A COLLODIAL ELECTROLYTE USED IN IT, AND THE PROCESSES FOR PRODUCING THEM

[76] Inventors: Lianxiang Wang; Anchen Zheng; Shuo Zheng; Hang Zheng, all of Room 101, 12 Naner Lane, Changjiang Road, Lushuenkuo District Dalian, China

[21] Appl. No.: 692,129

[22] Filed: Apr. 26, 1991

[30] Foreign Application Priority Data

Apr. 26, 1990 [CN] China .............................. 90192353.1
Apr. 28, 1990 [CN] China .............................. 90205334.5

[51] Int. Cl.$^5$ .............................................. H01M 10/10
[52] U.S. Cl. ........................................ 429/86; 429/190; 429/204
[58] Field of Search .......................... 429/190, 204, 86

[56] References Cited

U.S. PATENT DOCUMENTS

| | | |
|---|---|---|
| 4,317,872 | 3/1982 | Varma .................................. 429/190 |
| 4,863,816 | 9/1989 | Misra et al. ...................... 429/204 X |
| 4,937,156 | 6/1990 | Boeller et al. .................. 429/190 X |

FOREIGN PATENT DOCUMENTS

| | | |
|---|---|---|
| 86104708A | 1/1987 | China . |
| 86102428A | 10/1987 | China . |
| 86209279U | 2/1988 | China . |
| 2045148U | 9/1989 | China . |
| 57-58030 | 12/1982 | Japan . |
| 2088623A | 6/1982 | United Kingdom . |

Primary Examiner—Stephen Kalafut
Attorney, Agent, or Firm—Kenyon & Kenyon

[57] ABSTRACT

The invention provided a new type of high capacity storage battery, wherein the colloidal electrolyte is hard to hydration, and has no cracking, and some improvements on the said high cpacity colloidal storage battery are also disclosed.

17 Claims, 1 Drawing Sheet

HIGH CAPACITY COLLOIDAL STORAGE BATTERY, A COLLODIAL ELECTROLYTE USED IN IT, AND THE PROCESSES FOR PRODUCING THEM

The invention relates to a secondary battery, to a colloidal electrolyte used in the storage battery, and the processes for producing them.

Lead-acid storage battery, which is still one of the main types of storage batteries at present in the world, has advantages such as wide variety of application, low cost, and well-developed producing process. However, it exhibits some defects, such as, leaking and overflowing acid, releasing a large amount of acid mist during charging and discharging, large self-discharge, short service-life, much maintenance work etc., and the neccessity of frequently adjusting and adding acid causes the inconvenience in transportation, application and maintenance. In addition, the release of vast acid mist brings about environmental pollution. The acid mist released from storage batteries in charging workshop of the factories has an unpleasant and irritant smell, making people breathe with difficulty. Many harmful substances, including sulfur dioxide, hydrogen sulfide, sulfuric acid mist, etc., exist in the acid mist. It is reported that the sulfur dioxide has an irritant effect on human's respiratory organs. When the concentration of sulfur dioxide reaches to 10-15 ppm, the ciliary movement of the respiratory tract will be inhibited and mucous membranes will be harmed, and when the concentration of sulfur dioxide reaches to 20 ppm, the irritant effect apparently increases and causes cough. Moreover, the sulfur dioxide has an effect of carcinogenesis promoter, a sulfur dioxide concentration of 10 mg/m$^3$ may enhance the carcinogenisis of the carcinogen benzo <a> pyrene. The sulfur dioxide also influences the growth and development of organism. The hydrogen sulfide has a stinking smell and may cause people's poisoning. The irritation effect of the sulfuric acid mist is 10 times higher than that of sulfur dioxide (see The Encyclopedia of China, Environmental Science, The press of the Encyclopedial of China, Beijing, Shanghai, December 1983, p. 68, p. 258), injuring the people's health badly. Since the sulfuric acid storage battery leaks acid, the leaked acid will corrode the storage battery itself and preipherol equipments seriously. The accidents of burning the skin of operators in charging process may also often occur, and hence injure the operator's health.

Since the publication of the first U.S. Patent involving the process of producing colloidal electrolyte in 1921, many investigations of the colloidal electrolyte storage battery have been carried out, and numerous non-patent and patent literatures in this field have been published.

CN Patent 86102428 describes a silica-gel storage battery, in which the filler colloidal electrolyte comprises powders of coconut core as well as sulfuric acid and sodium silicate. The proportion of sulfuric acid (specific gravity 1.48-1.58): sodium silicate (specific gravity 1.05-1.09): powders of coconut core is 0.5-1.5-:5-1.5:0.004-0.008, and preferably 1:1:0.06. The isolating plates in the storage battery are made of glass fiber.

CN Patent 86209279U describes a silica gel electrolyte lead-acid storage battery, wherein the gel electrolyte consists of sulfuric acid and gelling agent for sulfuric acid. The gelling agent comprises mainly silicon dioxide, and glycerol is added as stabilizing agent to form silica sol. The gel electrolyte formed by mixing sulfuric acid and gelling agent has a specific gravity of 1.26-1.30 and is filled into the battery case containing anode plates and cathode plates in three layers. The colloidal electrolyte in each layer is allowed to stand for 2-4 hrs. after filling until it is cooled to room temperature, followed by filling the next layer. After all the three layers have been filled, the colloidal electrolyte is allowed to stand for 5-12 hrs., then the initial charging of the storage battery is carried out. Lignin sulfonic acid is added in the lead plaster of the cathode plates. The cathode and anode in the lead-antimony grid plates of the storage battery comprise 3.5%-8% of antimony, the content of calcium in grid plates is 0.17%-0.8%, and the content of lead in anode plate is enhanced by 5-15%.

Another CN Patent (Publication number 2045148) describes a storage battery with two layers of colloidal electrolyte, i.e., top layer and bottom layer; the top layer consists of 15-22% of sodium silidate, 3.0-6.0% of silicon dioxide, 1-2% of phosphoric acid and dilute sulfuric acid.

The colloidal electrolyte to storage battery disclosed in JP laid open patent 57-58030 consists of 2-10% of anhydrous silicic acid and 18-41% of sulfuric acid.

GB Patent 2088623A discloses a colloidal electrolyte formed from sulfuric acid, silicon dioxide, and advantageously phosphoric acid wherein the specific area of silicon dioxide is 20-500 m$^2$/g, preferably 100-200 m/g, the amount of phosphoric acid is 0.5-15%, preferable 4-6% (by weight, the same below) of sulfuric acid contained in the colloidal electrolyte, the content of the silicon dioxide in the colloidal electrolyte is 3-15% (by weigh, the same below), preferably 7-9%.

CN Patent 86104708 entitled "A process of preparing thixotropic colloidal electrolyte" describes a process of preparing electrolyte with silicon-containing gelling agent (sodium silicate, silica sol or amorphous powders of silica) and sulfuric acid, the specific area of silica particles in the silica sol used is 50-500 m$^2$/g, preferably 100-300 m$^2$/g, the colloidal electrolyte comprises 3-15%, preferably 5-15% of silicon dioxide and 30-48%, preferably 35-45% of sulfuric acid, the temperature is controlled at 10°-40° C. during the missing step of adding sulfuric acid dropwise to the silica sol with stirring.

The silica gel lead-acid storage batteries described in the aforementioned patents of prior art have a series of problems due to the unsuitable contents of silica sol (based on SiO$_2$) and sulfuric acid in colloidal electrolytes, for examples, the large amount of free dilute sulfuric acid in filler storage battery causes serious hydration phenomenon; cracks exist in colloidal electrolyte of silica gel lead-acid storage battery, and the capacity is considerable low; in some silica gel-lead-acid storage batteries a series defects may be caused by the use of sodium silicate as gelling agent or the high content of sodium oxide in silica sol, such as gelling over-fast, difficult to fill, serious self-discharge, low capacity, and short service life; In some cases the colloidal electrolytes have to be filled in two, three, even more parts, and the composition of each part of the filled electrolyte is different from each other, making the producing process complicated, the cost high, and the operation inconvenient; in some cases a special isolating material has to be placed between electrodes, and the electrodes need to be treated specially, therefore the preparation of the storage battery become more complicated, making the cost even higher and application difficult.

The object of the present invention is to provide a new type of high capacity storage battery, wherein the colloidal electrolyte is hard to hydration and has no cracking, making the new type of silica-gel storage battery having the following features, such as, high capacity, long service-life, less-discharge, easy to be produced, no need of placing a special isolating material between electrodes, and the electrodes needn't special treatment, so the storage battery is low-cost and easy to extend application.

Another object of the present invention is to provide a process of producing the aforesaid new type of storage battery and its colloidal electrolyte with low cost and a simple convenient manner.

A colloidal electrolyte with high capacity of the invention comprises 3–9.9% of silica sol (based on $SiO_2$, by weight, the same below) and 48.1–75% of sulfuric acid, based on the weight of the colloidal electrolyte as 100%, the specific area of silicon dioxide particles in the silica sol used is 150–250 $m^2/g$.

The process of the invention for producing electrolyte with high capacity comprises the steps of: adding the silica sol containing $SiO_2$ particles with a specific area of 150–250 $m^2/g$ and the sulfuric acid simultaneously into an acid-resisting reactor under continuous stirring, keeping the reaction temperature at 20°–50° C. to obtain a colloidal electrolyte (as 100%) comprising 3–9.9% of silica sol (based on $SiO_2$) and 48.1–75% of sulfuric acid, cooling and stirring the reactants for further 1–4 hours until the temperature of the reaction mixture drops to below 30° C., discharging the resulting colloidal electrolyte from the reactor.

In has been noted that the content of the silica sol (based on $SiO_2$) containing $SiO_2$ particles with a specific area of 150–250 $m^2/g$ in colloidal electrolytes with effective concentration of sulfuric acid is one of the important factors affecting the behaviors of the colloidal electrolyte, because that the content of the silica sol (based on $SiO_2$) influences directly the pore size of the network in the gel. In the case that the content of silica sol in colloidal electrolyte is less than 3% and a gelation time is longer than 6 hrs., a network with large pore size and low structural stress will be obtained, which may be broken during the process of discharge and consequently an integrated gel can not be obtained. During the process of filling such electrolyte into silica gel-lead-acid storage battery, foam may emerge around the network pores and serious hydration may occur. On the other hand, in the case that the content of silica sol in colloidal electrolyte is more than 9.95% (based on $SiO_2$), a network with small pore size and high structural stress will be obtained, but the obtained colloidal electrolyte exhibits high viscosity and rapid gelation with a gelation time less than 2 hrs., resulting a product with high cost and poor thixotropy. This colloidal electrolyte is difficult to be filled into the storage battery, and even though the process of filling is completed, cracks may occur during the discharging process. Moreover, since the colloidal electrolyte has a high content of silica sol (based on $SiO_2$) and a small pore size, its resistance will increase with increasing content of silica sol in the colloidal electrolyte, and hence the internal resistance of the silica-lead-acid storage battery filled with colloidal electrolyte increases, while the capacity reduces sharply. Therefore, the content of the silica sol in colloidal electrolyte is preferably from 3 to 9.9%.

The content of sulfuric acid in colloidal electrolyte with effective concentration of silica (based on $SiO_2$) is also an important factor affecting the properties of colloidal electrolyte. When the content of the sulfuric acid is less than 48.1%, the capacity of the silica gel storage battery after charging will be apparently reduced. When the content of the sulfuric acid is more than 75%, the obtained colloidal electrolyte will have high viscosity and is difficult to be filled. After charging of the storage battery filled with this kind of colloidal electrolyte, the active substances are easy to be detached from the electrode plates, making the service-life of the storage battery shorten and the startability poor at low temperature, comsequently the content of sulfuric acid in the colloidal electrolyte is peferably in the range of 48.1–75%.

It should be emphasized that the more important factor influencing the behaviors of colloidal electrolyte is the combined effect of both concentrations of silica sol (based on $SiO_2$) and sulfuric acid in the colloidal electrolyte. The experimental results indicate that a critical factor influencing the properties, such as capacity etc., of the colloidal electrolyte is the ratio of surfuric acid/$SiO_2$ (g/g) within the aforesaid concentration ranges of 3–9.9% of silica sol (based on $SiO_2$) and 48.1–75% of sulfuric acid in the colloidal electrolyte. The colloidal electrolyte with a sulfuric acid/$SiO_2$ ratio (g/g) from 4.5 to 10.5 within the aforementioned concentration ranges of silica sol and sulfuric acid has a higher capacity.

In order to further increase the capacity, it is preferred to add aluminum hydroxide to the colloidal electrolyte. The content of aluminum hydroxide in the colloisal electrolyte (based on the weight of the colloidal electrolyte as 100%) is preferably 0.1–0.5 wt. % (based on aluminum oxide).

The silica sol as one of starting materials for producing the colloidal electrolyte is a commercial product, which contains 10–30% of silicon dioxide, specific gravity of 1.060–1.22, pH 8–9.5. The content of sodium oxide ($Na_2O$) in the silica sol is between 0.2–0.4%. When the content of sodium oxide is more than 0.4%, the obtained colloidal electrolyte will exhibit a high self-discharge and rapid gelation after being filled into storage battery, and so, the less of the sodium oxide content in silica sol the better. The content of iron in silica sol is preferably less than 0.003%, and is also the less the better. High content of iron in silica sol may result in high self-discharge. In the case that the content of silica oxide in the commercial silica sol is high, it may be diluted by pure water to a suitable concentration as starting material for producing colloidal electrolyte. The pure water used in the present invention is deionized water, preferably having a specific resistance more than $2 \times 10^5$ ohm/cm. The higher the specific resistance of the deionized water, i.e. the purer, the better.

The sulfuric acid used may be any sulfuric acid for storage battery, industrial sulfuric acid, analytical pure (A.R) sulfuric acid and chemical pure (C.P) sulfuric acid. Concentrated sulfuric acid can be used as staring material for producing colloidal electrolyte, however, it may also be diluted with pure water to an appropriate concentration easy to be added.

To prepare aluminum hydroxide, adding aluminum salts (such as aluminum chloride, aluminum sulfate and aluminum nitrate) to water, precipatating the aluminum ions as aluminum hydroxide, filtering and washing with hot water until no $Cl^-$, $SO_4^=$ or $NO_3^-$ ions could be detected, followed by adding effective amount of the aluminum hydroxide into the silica sol under stirring to make the content of aluminum hydroxide in the resulting colloidal electrolyte being 0.1-0.5% (based on aluminum oxide).

The silica sol comprising 10-30% of $SiO_2$ particles with a specific area of 150-250 $m^2/g$ and the sulfuric acid are added simultaneously into a acid-resisting reactor (for example, three necked glass flask, acid-resisting reactor), the reaction temperature is controlled at 20°-50° C. In order to control the reaction temperature at 20°-50° C., the acid-resisting reactor may be cooled by cold water, ice water or salt/ice water. The experimental results indicate that when the reaction temperature exceeds 50° C., more acid gas will be released, corroding the equipment and hindering the operation. Moreover, the overlong retention time of the colloid electrolyte at a temperature above 50° C. tends to deteriorate the thixotropy and stability of the products. On the other hand, low reaction temperature below 20° C. makes the feed rate too slow. Therefore the reaction temperature is preferably controlled at 20°-50° C. Feed time is generally controlled in 1-3 hrs., the period of cooling and stirring is generally 1-4 hrs. (the said period of continuous cooling and stirring is referred to as the time interval from stopping feed to that the temperature of reaction mixture is cooled to below 30° C.), so as to obtain a product comprising 3-9.9% of the silica sol (based on $SiO_2$), 48.1-75% of sulfuric acid, and preferably the ratio of $H_2SO_4/SiO_2$(g/g) is 4.5-10.5 within the aforementioned content ranges of the silicon dioxide and the sulfuric acid.

A sample is taken off from the reaction mixture to determine whether the contents of sulfuric acid and silicon dioxde are consistent with the formulation, otherwise the mixture needs to be adjusted by adding sulfuric acid or silica sol or deionized water, cooling and stirring the reaction mixture for further 1-2 hrs., removing the reaction product from the reactor after it has been cooled to a temperature below 30° C. If the analyzed contents of the sulfuric acid and the silicon dioxide in the sample are consistent with those of the desired formulation, the product can be removed from the reactor after it has been cooled to a temperature below 30° C.

The appearance of the resulting colloidal electrolyte is milk-white in color with a specific gravity of 1.32-1.35, gelation time of 2-4 hrs., and a serivce-life as long as 2-3 years.

The analytical methods used in the process of the present invention are; gravimetry for silicon dioxide, turbidimetry using silver nitrate for chlorine ion, turbidimetry using barium chloride for sulfate ion, ammonium sulfocyanide titration for iron, and flame photometry or atomic absorption spectrometry for sodium oxide.

The specific area and the particle size of the silica sol are determined by the following method known to those who skilled in the art. An amount of sample is added to a 20% aqueous solution of sodium chloride, titrated with 0.1N NaOH to pH 9. The volume of the NaOH solution consumed is recorded and calculation is made according the following formula:

$$S = 32 \times V \times \frac{N}{0.1} - 25$$

where:

S—specific area of sample, $m^2/g$
V—consumed volume of NaOH solution, ml
N—equivalent concentration of the NaOH solution
25—correction factor of the empirical formula.

To convert the specific area to particle size, follows $$As = K/S$$

where:

AS—diameter of colloidal particles (mµ)
S—specific area of colloidal particles ($m^2/g$)
K—a constant of 2720

A high capacity colloidal storage battery of the present invention comprises battery case [1], anode plate [2], cathode plate [3], isolating plate [4], binding post for anode [5], binding post for cathode [6], hole for filling liquid [7], cover for battery [8] and new electrolyte [9] here in, connecting strip [10], buffer device [11] and device for treating acid mist. The colloidal electrolyte [9], used in the storage battery of the invention is prepared by the mathod above, and it comprises 3-9.9% (by weight, the same below) of silica sol (based on $SiO_2$, the same below) and 48.1-74% of sulfuric acid.

The battery case [1] of the storage battery of this invention is generally made by press-molding a material selected from the group consisting of ABS plastic, polypropylene plastic, bakelit and hard rubber. It also contains anode plate [2], cathode plate [3], isolating plate [4], binding post for anode [5], binding post for cathode [6], hole for filling liquid [7] (a gas permeable cover may be placed on the hole to allow gas pass through), cover of battery [8] but the colloidal electrolyte herein is used to replace dilute sulfuric acid electrolyte.

Since the colloidal electrolyte is used to replace the dilute sulfuric acid electrolyte in the high capacity capacity colloidal storage battery of the present invention, the released amount of acid mist during use in floating charging is reduced by 50-60% compared with that of the storage battery using dilute sulfuric acid as electrolyte.

Another object of the invention is to provide a buffer device [11] attached on the inner top of the storage battery, which can further reduce the amount of released acid mist from the high capacity storage battery during floating charging. The said buffer device [11] is a piece of acid-resisting and compressible plastic selected from the group consisting of polyether type-polyurethane foam plastics, polyester type-polyurethane foam plastics and porous foam rubber. Preferably, the size of the plastic piece is suited to be put into the storage battery, and the thickness is 3-15 mm. The particular attached position is the inner top of the storage battery, and the bottom of the plastic piece is in contact with the colloidal electrolyte [9]. The buffer device has following three functions:

(1) Making the colloidal electrolyte comprising an appropriate amount of water, and inhibiting the vaporation of water from the colloidal electrolyte.

(2) The buffer derice [11] will absorb the released dilute sulfuric acid (i.e., sulfuric acid and water) into the pores of the foam when a small amount of dilute sulfuric acid is formed in the colloidal electrolyte of the colloidal storage battery, and will release the dilute sulfuric acid absorbed in the foam when the colloidal electrolyte in the storage battery is dry and needs water, therefore preventing the colloidal electrolyte from cracking. Therefore, the buffer device exterts a buffering effect and can be considered as a buffer layer.

(3) The buffer device can absorb and hence remove about 50% of the acid mist released from the colloidal electrolyte during the use of the colloidal storage battery in floating charging, that is, due to the attachment of the buffer device, the amount of acid mist released from the colloidal storage battery of this invention during use in floating charging is only about 25% of that released from the storage battery using dilute sulfuric acid as electrolyte, about 75% of the acid mist is eliminated.

In order to remove all the acid mist released from the storage battery of this invention during use in floating charging, it is more preferably to attach a device for treating acid mist (replacement of the gas permeable cover) to the hole for filling liquid [7]. The said device for treating acid mist is a small cylindric device with a cover on its top, around the cover there are holes as gas outlet (typically 6-16 holes), the cover is connected with the cylinder in a screw-in manner, the bottom of the cylinder is connected with the hole for filling liquid [7] also in a screw-in manner. At the lower part of the cylinder there is a bottom with a hole in its center, a tube which has a length of 1/5-⅓ of the cylinder's height is inserted in the hole and connected with the inside of the storage battery. The cylinder contains a plastic selected from polyether type-polyurethane foam plastics or polyester type-polyurethane foam plastics impregnated with NaOH solution. The concentration of the sodium hydroxide is generally from 5 to 20 wt. %. The device can be made of polymethyl methacrylate, polyvinyl chloride or baxelit plastics by press-molding. The remainder of acid mist, penetrating the buffer device and entering into cylinder via the tube at the bottom of cylinder, is absorbed and neutralized by the sodium hydroxide in the plastic foam. The resulting water flows to the bottom of the cylinder and hence the acid mist is completely eliminated. Further details are disclosed in CN patent application 9020357.1 by Wang Liang-xiang et. al.

The colloidal electrolyte used in the storage battery of the invention is filled as follows:

The colloidal electrolyte, which has been stored statically in a gel state in a plastic bucket for a long time, is shaked vigorously (preferably by a electromotor) for tens seconds, until it regains the original flowability and be sure there is no small particles. It is slowly filled into the storage battery which has not been filled with dilute sulfuric acid, preferably to a filling level of 10-15 mm above the electrode plates. The storage battery filled with the colloidal electrolyte is allowed to stand statically for 4-6 hrs. After the colloidal electrolyte is essentially stable, the charging process can be carried out according to the method described in the operation manual of the storage battery. The method of charging is the same with that used for lead-acid storage battery using dilute sulfuric acid as electrolyte, but an effective amount of deionized water must be added to prevent dry-charging strictly. After the charging process is completed, the buffer device is attached and an effective amount of water is added, then the buffer device can keep moist for a long time.

The present invention has following advantages:

1. The high capacity colloidal storage buttery of this invention has following advantages compared with storage battery using dilute sulfuric acid as electrolyte:

(1) The high capacity colloidal storage battery of this invention completely eliminates the release of acid mist during floating charging, preventing the environmental pollution, protecting the operators' health, and providing better and safe operation. The released amount of hydrogen and oxygen gases, which are imflamable and explosive, is reduced by about 56% compared with that released from sulfuric acid storage battery, and hence the accident of explosion is prevented.

(2) The high capacity colloidal storage battery of this invention does not leak or overflow acid, no leakage of acid takes place at a inclination angle of 90° (For sulfuric acid storage battery leaking will take place at a inclination angle above 48.5°), therefore prevents the other materials from being corroded, and saves the expense in anti-corrosive equipments. The insulation to ground is 0.5 V for the sulfuric acid-lead storage battery and 0.25 V for the high capacity storage battery of this invention, the insulation performance is good and has been improved by 50%, ensuring the storage battery consistently being in good insulation condition to round, preventing the occurence of electrical spark, and hence resolved the problem which has not been being unsolved overyears.

(3) The high capacity colloidal storage battery of this invention exhibits low corrosiveness, good cold-resistance, and less self-discharge.

(4) The high capacity colloidal storage battery of this invention always keeps its surface clean, the number of times needed for adding additional deionized water is reduced by more than 50% compared with that in the case of sulfuric acid storage battery, only once per 6 months is needed to add deionized water, and the required amount of the deionized water is reduced by ⅔ compared with that in sulfuric acid storage battery. The sulfuric acid-lead storage battery needs to be repaired once per 6 months, while the high capacity colloidal storage battery of this invention has been worked normally for more than 3 years without maintenance, reducing the amount of maintenance work to a great extent.

(5) The service-life of the high capacity colloidal storage battery of the invention is extended more than 100% compared with that of the sulfuric acid storage battery.

2. The high capacity colloidal storage battery of this invention has following advantages compared with the colloidal storage battery of the prior art:

(1) Completely eliminating the release of acid mist, preventing the environmental pollution, and protecting the operators' health.

(2) The high capacity colloidal storage battery of this invention has higher capacity compared with that of colloidal storage battery in prior art, approaching the capacity of sulfuric acid storage battery. According to the international standard on the rated capacity of discharge in 20 hrs., the average capacity of the high capacity storage battery of this invention can reach to 85% of that of the sulfuric acid storage battery with same type, and the maximum capacity can be up to 91.6% of that of the sulfuric acid storage battery.

(3) The high capacity colloidal storage batteries of this invention all have good startability, superior to other colloidal storage batteries and approaching to that of the sulfuric acid storage battery, particularly suitable for starting under high power. In a comparative test carried out on a boat, a set (4 pieces) of high capacity colloidal storage battery of this invention and another set (4 pieces) of sulfuric acid storage battery were used for starting main engine and emergency lighting, the results indicate that the startability of the main engine can meet the requirement for the sulfuric acid-lead storage battery. Under the circumstance that the main engine is started as frequently as 8–10 times each day, the storage battery is still in good working condition, showing the same performance as that of the sulfuric acid storage battery but about two times longer service-life. Moreover, in a test of starting automobiles carried out in frigid zone, the storage batteries of this invention also show good startability even at a temperature of −40° C.

(4) The high capacity colloidal storage battery of this invention shows a starting ability of 1.28 V, a charging-acceptability of 6.3 A (excveeds the GB of 6.0 A), no substantial portential drop during discharge at 120 A/3 sec., service life of over 3 years, less self-discharge, low degree of hydration after initial charging, gelation time of 2–4 hrs., no cracks and hydration during application. It is suitable for rapid charging, and the capacity for practical application can be achieved within 2–2.5 hrs. of charging time.

(5) The high capacity colloidal storage battery of this invention needs only once filling process, it is low cost, and easy to operate and extend application. It can be used in automobile, ship, storage battery car, airplane, miner's lamp, various emergency lamp, and computer, with great economic benefit. For instance, according to an estimination of a ship-repair factory in a fishery company, the expenses can be saved more than 1,300,000 Chinese Yuan each year by using the high capacity storage battery of the invention. The social benefit created by preventing environmental pollution and apparatus corrosion is even more invaluable.

FIG. 1. The sectional view of the high capacity colloidal storage battery of this invention: [1] battery case [2] anode plate [3] cathode plate [4] isolating plate [5] binding post for anode [6] binding post for cathode [7] hole for filling liquid [8] cover of battery [9] colloidal electrolyte [10] connecting strip [11] buffer device and a device for treating acid mist [12].

The following non-limiting embodiments are given merely as further illustrative of this invention, and are not to be considered as limiting the scope of the present invention, which will be defined in the appended claims.

EXAMPLE 1

The high capacity colloidal storage battery of this invention consists of battery case [1], anode plate [2], cathode plate [3], isolating plate [4], binding post for anode [5], binding post for cathode [6], hole for filling liquid [7], cover of battery [8], colloidal electrolyte [9], connecting strip [10], buffer device [11] and a device for treating acid mist [12]. Except for the buffer device [11] and the device for treating acid mist [12], other structure and various parts and the producing process thereof are well known to those who skilled in the art of this field. Battery case [1] is made of ABS plastics. The storage battery used is one which has not been filled with dilute sulfuric acid, the filled colloidal electrolyte comprises 6.0% silica sol, 55% of sulfuric acid, the ratio of sulfuric acid/silica dioxide (g/g) is 9.16. It has a capacity of 90%, suitable for storage battery discharging in high power. The buffer device [11] attached to the inner top of the storage battery is a piece of polyester type-polyurethane foam plastic with a thickness of 5 mm. The bottom of the foam plastic is in contact with the colloidal electrolyte [9]. The storage battery does not hydrate or crack during use. The released amount of acid mist during floating charging is only 23% of that released from the sulfuric acid storage battery with same type. During floating charging, the released amount of hydrogen and oxygen gases are only 44% of that released from the sulfuric acid storage battery with same type.

EXAMPLE 2

This example is substantically the same as example 1, except that not only the buffer device [11] is attached to the inner top of the storage battery, but also a device for treating acid mist [12] is installed at the filling hole [7] of the storage battery. The tube in the device for treating acid mist has a length being ¼ of the cylinder height. The device [12] made of polyester type-polyurethane foam plastic is impregnated with 10% NaOH solution. The release of acid mist during floating charging is completely eliminated, preventing the environmental pollution. The released amount of hydrogen and oxygen gases are only 45% of that of the sulfuric acid storage battery with same type.

EXAMPLE 3

The example is substantially the same as example 1, except that the filled colloidal electrolyte comprises 7.0% of silica sol, 48.5% of sulfuric acid, the ratio of sulfuric acid/silicon dioxide (g/g) is 6.93, capacity is 88%. The released amount of acid mist during floating charging is only 23.5% of that released from the sulfuric acid storage battery with same type.

EXAMPLE 4

This example is substantially the same as example 1, except that the filled colloidal electrolyte comprises 9.9% of silica sol, 60% of sulfuric acid, the ratio of sulfuric acid/silica dioxide (g/g) is 6.06, capacity is about 86%, the released amount of acid mist during floating charging is only 25.1% of that released from the sulfuric acid-lead storage battery with same type. The released amount of hydrogen and oxygen gases during floating charging is 45.1% of that released from the sulfuric acid storage battery with same type.

EXAMPLE 5

This example is substantially the same as example 1, except that the filled colloidal electrolyte comprises 5% of silica sol, 52% of sulfuric acid, the ratio of sulfuric acid/silicon dioxide (g/g) is 10.4, capacity is about 88%, the released amount of acid mist during floating charging is only 25.1% of that released from the sulfuric acid storage battery with same type. The released amount of hydrogen and oxygen gases during floating charging is 42.9% of that released from the sulfuric acid storage battery with same type.

EXAMPLE 6

This example is substantially the same as example 5, except that the filled colloidal electrolyte also comprises 0.3% of aluminum oxide, the capacity is 91.6%. The released amount of acid mist during floating charging is only 24.8% of that released from the sulfuric acid storage battery with same type. The released amount of hydrogen and oxygen gases during floating charging is only 42.2% of that released from the sulfuric acid storage battery with same type.

EXAMPLE 7

A commercial silica sol having 21% of $SiO_2$ particles with a specific area of 210 $m^2/g$, 0.25% of sodium oxide, less than 0.003% of iron, PH 8.5 and specific gravity 1.13, and sulfuric acid (containing 77.03% of $H_2SO_4$) as starting materials were added simultaneously into a acid-resisting reactor, the reaction temperature was controlled at 45° by cooling with ice water, so as to produce a colloidal electrolyte containing 6.6% of $SiO_2$ sol, 55.0% of $H_2SO_4$, and a ratio of $H_2SO_4/SiO_2$ (g/g) of 9.16. The water used to dilute and formulate silica sol and sulfuric acid has a specific resistivity of 250,000 ohms/cm. The feeding was completed within about 2 hrs., followed by colling and stirring for further 2.5 hrs. The resulting colloidal electrolyte, being milk-white in color and having a specific gravity of 1.35, was discharged from the reactor after its temperature droped to 27° C. The colloidal electrolyte has a gelation time of 2 hrs. in the filled storage battery and can be stored for 2.5 years without hydration and crack. The colloidal electrolyte filled in the new storage battery which has not been filled with sulfuric acid electrolyte, has a capacity of about 90%, suitable for the storage battery discharging in high power.

EXAMPLE 8

The process and conditions used in this example are substantially the same with those in example 7, except that the starting material silica sol contains 14% of $SiO_2$ particle with a specific area of 180 m$^2$/g, 0.2% of sodium oxide, less than 0.003% of iron, pH of 9.0, specific gravity of 1.09, the starting material sulfuric acid contains 97.0% of $H_2SO_4$, the reaction temperature was controlled at 44°±1° C., so as to produce a colloidal eletrolyte comprising 7.0% of silica sol, 48.5% of $H_2SO_4$, and a ratio of $H_2SO_4/SiO_2$ (g/g) of 6.93. The feeding was completed in about 3 hrs., followed by cooling and stirring for further 2.5 hrs. The resulting colloidal electrolyte has a specific gravity of 1.35, a gelation time of 3 hrs. in the filled storage battery, and can be stored for 2.5 years without cracks and hydration, showing a capacity of about 88%.

EXAMPLE 9

The procedure and conditions used in this example are substantially the same with those in example 7, except that the starting material silica sol contains 29.7% of SiO particles with a specific area of 195 m$^2$/g, 0.25% of sodium oxide, less than 0.003% of iron, pH of 9.5 and specific gravity of 1.19, the starting material sulfuric acid contains 87.37% of $H_2SO_4$, the reaction temperature was controlled at 47°±1° C., so as to produce a colloidal electrolyte comprising 9.9% of silica sol, 60.0% of sulfuric acid, and a ratio of sulfuric acid/silicon dioxide (g/g) of 6.06. Cooling and stirring for further 3.5 hrs., the resulting colloidal electrolyte has a specific gravity of 1.35, gelation time of 2 hrs., in the filled storage battery, and can be stored for 2 years without cracks and hydration, exhibiting a capacity of about 86%.

EXAMPLE 10

The procedure and conditions used in this example are substantially the same with those in example 7, except that the starting material silica gel contains 15% of $SiO_2$ particles with a specific area of 240 m$^2$/g, 0.20% of sodium oxide, less than 0.003% of iron, pH of 9.0 and specific gravity of 1.092, the starting material sulfuric acid contains 78% of $H_2SO_4$, the reaction temperature was controlled at 46°±1° C., so as to produce a colloidal eletrolyte comprising 5% of silica sol, 52% of sulfuric acid, and a ratio of $H_2SO_4/SiO_2$ (g/g) of 10.4, cooling and stirring for further 3.0 hrs., the resulting colloidal electrolyte has a specific gravity of 1.33, gelation time of 2 hrs. in the filled storage battery, and can be stored over 2 years without cracks and hydration, exhibiting a capacity of about 88%.

EXAMPLE 11

The procedure and conditions used in this example are substantially the same with those in example 10, except that aluminum hydroxide was added into the starting material silica sol to make a silica sol comprising 0.9% of $Al_2O_3$. The resulting colloidal electrolyte comprises 03.% of $Al_2O_3$ and has a capacity of 91.6%.

EXAMPLE 12

The procedure and conditions used in this example are substantially the same with those in example 7, except that the starting material silica sol contains 20% of $SiO_2$ particles with a specific area of 185 m$^2$/g, 0.28% of sodium oxide, less than 0.003% of iron, pH of 8.4, specific gravity of 1.126, the starting material sulfuric acid contains 96.03% of $H_2SO_4$, reaction temperature was comtrolled at 43°±1° C., so as to produce a colloidal electrolyte comprising 9.9% of silica sol, 48.5% of sulfuric acid, and a ratio of $H_2SO_4/SiO_2$ (g/g) of 4.9, cooling and stirring for further 2.5 hrs. The resulting colloidal electrolyte has a specific gravity of 1.34, gelation time of about 2 hr. in the filled storage battery, and can be stored over 2 years without cracks and hydration, exhibiting a capacity of about 86%.

EXAMPLE 13

The procedure and conditions used in this example are substantially the same with those in example 12, except that the starting material silica sol contains 30% of $SiO_2$ and a specific gravity of 1.21, starting material sulfuric acid contains 100% of $H_2SO_4$, the reaction temperature was controlled at 49°±1° C., so as to produce a colloidal electrolyte comprising 9.0% of silica sol, 70% of sulfuric acid, the ratio of $H_2SO_4/SiO_2$ (g/g) is 7.78. The feeding time is 3 hrs., followed by cooling and stirring for further 3.5 hrs., and the resulting colloidal electrolyte has a specific gravity of 1.35 and a capacity of 86%.

We claim:
1. A high capacity colloidal storage battery which comprises a battery case, anode plates, cathode plates, isolating plates, a buffer device and an electrolyte, wherein the electrolyte comprises:
   a) 3 to 9.9% by weight of silica sol ($SiO_2$);
   b) 48.1 to 75% by weight of sulfuric acid; and
   c) 15.1 to 48.9% of water.
2. A high capacity colloidal storage battery according to claim 1 wherein said buffer device is attached to said storage battery at said storage battery's inner top.
3. A high capacity colloidal storage battery according to claim 1, wherein said buffer device is in contact with said colloidal electrolyte in said storage battery.
4. A high capacity colloidal storage battery according to claim 1, wherein the said buffer device is made of a piece of compressible and acid-resisting foam plastic and its thickness is 3 to 5 mm.
5. A high capacity colloidal storage battery according to claim 4, wherein the said buffer device is made of a foam plastic selected from polyether-type-poly-urethane foam plastic, polyester type-polyurethane foam plastic, and porous foam rubber.

6. A high capacity colloidal storage battery according to claim 1, wherein the size and the shape of the buffer device is suited to be put into the storage battery.

7. A high capacity colloidal storage battery according to claim 1, wherein a device for treating acid mist is attached to a filling opening in said storage battery.

8. A high capacity storage battery according to claim 1 wherein said silica sol comprises particles with specific area of 150 to 250 $m^2/g$.

9. A high capacity colloidal storage battery according to claim 1 wherein said electrolyte further comprises 0.1 to 0.5% of aluminum hydroxide.

10. A high capacity colloidal storage battery according to claim 1 wherein a device for treating acid mist is attached to a filling opening in said storage battery.

11. A high capacity colloidal storage battery which comprises a battery case, anode plates, cathode plates, isolating plates and an electrolyte, wherein the electrolyte comprises:
   a) 3 to 9.9% by weight of silica sol ($SiO_2$);
   b) 48.1 to 75% by weight of sulfuric acid; and
   c) 15.1 to 48.9% of water,
wherein a device for treating acid mist is attached to a filling opening in said storage battery.

12. A high capacity colloidal storage battery according to claim 11 wherein said electrolyte also comprises about 0.1 to 0.5% of aluminum hydroxide.

13. A high capacity colloidal storage battery according to claim 11 wherein said silica sol comprises silica particles with a specific area of 150–250 $m^2/g$.

14. A high capacity colloidal storage battery which comprises a battery case, anode plates, cathode plates, isolating plates and an electrolyte, wherein the electrolyte comprises:
   a) 3 to 9.9% by weight of silica sol ($SiO_2$);
   b) 48.1 to 75% by weight of sulfuric acid;
   c) 15.1 to 48.9% of water; and
   d) 0.1 to 0.5% of aluminum hydroxide.

15. A high capacity colloidal storage battery according to claim 14 wherein said silica sol comprises silica particles with a specific area of 150–250 $m^2/g$.

16. A high capacity colloidal storage battery according to claim 14 wherein a device for treating acid mist is attached to a filling opening in said storage battery.

17. A process for producing a colloidal thixotropic electrolyte, which comprises the steps of:
   a) preparing an aqueous sulfuric acid of suitable concentration from sulfuric acid and water;
   b) adding said aqueous sulfuric acid and silica sol, containing an effective amount of aluminum hydroxide, dropwise to an acid-resisting reactor at a temperature of 20° to 50° C. with continuous stirring to form a reaction mixture; and
   c) stirring and cooling said reaction mixture further for 1 to 4 hours until the temperature of said mixture is below 30° C. to form a colloidal electrolyte comprising 3–9.9% of silica sol ($SiO_2$), 48.1–75% of sulfuric acid, 0.1–0.5% of aluminum hydroxide and 15.1–48.9% of water.

* * * * *